United States Patent
Panis et al.

(10) Patent No.: US 9,649,796 B2
(45) Date of Patent: May 16, 2017

(54) METHOD FOR PRODUCING A SENSOR, AND SENSOR

(71) Applicants: CONTINENTAL TEVES AG & CO. OHG, Frankfurt (DE); CONTINENTAL AUTOMOTIVE GMBH, Hannover (DE)

(72) Inventors: Marc Panis, Bonheiden (BE); Matthias Viering, Darmstadt (DE); Lothar Biebricher, Oberursel (DE); Robert Déléris, Toulouse (FR); Leon Apers, Londerzeel (BE); Marie-Noelle Gris, Niel (BE); Matyas Czeh, Pustavám (HU)

(73) Assignees: Continental Teves AG & Co. oHG, Frankfurt (DE); Continental Automotive GmbH, Hannover (DE)

( * ) Notice: Subject to any disclaimer, the term of this patent is extended or adjusted under 35 U.S.C. 154(b) by 242 days.

(21) Appl. No.: 14/365,670

(22) PCT Filed: Dec. 10, 2012

(86) PCT No.: PCT/EP2012/075000
§ 371 (c)(1),
(2) Date: Jun. 16, 2014

(87) PCT Pub. No.: WO2013/087587
PCT Pub. Date: Jun. 20, 2013

(65) Prior Publication Data
US 2014/0352461 A1 Dec. 4, 2014

(30) Foreign Application Priority Data
Dec. 17, 2011 (DE) .......... 10 2011 121 412

(51) Int. Cl.
*B29C 45/14* (2006.01)
*B29C 45/16* (2006.01)
(Continued)

(52) U.S. Cl.
CPC .. *B29C 45/14336* (2013.01); *B29C 45/14065* (2013.01); *B29C 45/1671* (2013.01);
(Continued)

(58) Field of Classification Search
CPC ........ B29C 45/14336; B29C 45/14065; B29C 45/1671; B29C 45/14639;
(Continued)

(56) References Cited

U.S. PATENT DOCUMENTS 6,049,463 A * 4/2000 O'Malley ........ G06K 19/07745
174/255
6,212,955 B1 4/2001 Tanaka et al.
(Continued)

FOREIGN PATENT DOCUMENTS

DE 10 2006 030 133 A1 2/2007
DE 10 2006 029 980 A1 1/2008
(Continued)

OTHER PUBLICATIONS

International Search Report for PCT Application No. PCT/EP2012/075000 mailed Apr. 17, 2013.
(Continued)

*Primary Examiner* — Francis Gray
(74) *Attorney, Agent, or Firm* — RatnerPrestia

(57) ABSTRACT

The invention relates to a method for producing a sensor. In the method, a sensor element having an IC is pre-overmolded to produce a preform, wherein the preform is designed in such a way that the preform can accommodate electrical contacts for the sensor having various dimensions and/or in various positions by press fitting. The electrical
(Continued)

contacts are pressed into holes/recesses of the preform, the connections of the IC of the sensor are connected to the electrical contacts, and the preform is inserted into an injecting mold and is overmolded to produce the finished sensor. In this way, sensors for different applications can be produced in a substantially standardized manner. The invention further relates to a sensor.

9 Claims, 7 Drawing Sheets

(51) Int. Cl.
 G01D 11/24 (2006.01)
 B29L 31/34 (2006.01)
(52) U.S. Cl.
 CPC ...... *G01D 11/245* (2013.01); *B29C 45/14639* (2013.01); *B29C 2045/14131* (2013.01); *B29C 2045/1673* (2013.01); *B29K 2995/0005* (2013.01); *B29K 2995/0008* (2013.01); *B29L 2031/34* (2013.01)
(58) Field of Classification Search
 CPC .. B29C 2045/14131; B29C 2045/1673; B29K 2995/0005; B29K 2995/0008; B29L 2031/34; G01D 11/245
 See application file for complete search history.

(56) References Cited

U.S. PATENT DOCUMENTS

| | | |
|---|---|---|
| 6,427,316 B1 | 8/2002 | Shinjo et al. |
| 7,170,281 B2 | 1/2007 | Harada |
| 7,444,877 B2 | 11/2008 | Li et al. |
| 9,272,451 B2 | 3/2016 | Reese |
| 2005/0007098 A1 | 1/2005 | Harada |
| 2005/0268732 A1 | 12/2005 | Fujita et al. |
| 2006/0169059 A1 | 8/2006 | Kawasaki et al. |
| 2007/0001664 A1 | 1/2007 | Steinbrink et al. |
| 2007/0023283 A1* | 2/2007 | Huang .............. B29C 45/14639 204/400 |
| 2008/0198559 A1* | 8/2008 | Mueller ............... G01D 11/245 361/728 |
| 2010/0251999 A1 | 10/2010 | Kondo et al. |
| 2012/0043131 A1* | 2/2012 | Christov ........... B29C 45/14073 174/521 |

FOREIGN PATENT DOCUMENTS

| | | |
|---|---|---|
| DE | 102010014504 | 10/2011 |
| FR | 2 864 700 | 7/2005 |
| JP | 10203062 A * | 8/1998 |
| JP | 2001116815 | 4/2001 |
| JP | 2003066058 | 3/2003 |
| JP | 2003251655 | 9/2003 |
| JP | 2005109027 | 4/2005 |
| JP | 2010013633 | 1/2010 |
| JP | 2011067976 | 4/2011 |
| WO | WO 2010/011206 A1 | 1/2010 |

OTHER PUBLICATIONS

Written Opinion of the International Searching Authority (Supplemental Sheet) for PCT Application No. PCT/EP2012/075000 mailed Apr. 17, 2013.

German Search Report for Application No. 10 2011 121 412.0 dated Sep. 28, 2012.

First Chinese Office Action for Chinese Application No. 201280060829.X mailed Aug. 18, 2015, including English translation.

Second Chinese Office Action for Chinese Application No. 201280060829.X mailed Mar. 23, 2016, including English translation.

* cited by examiner

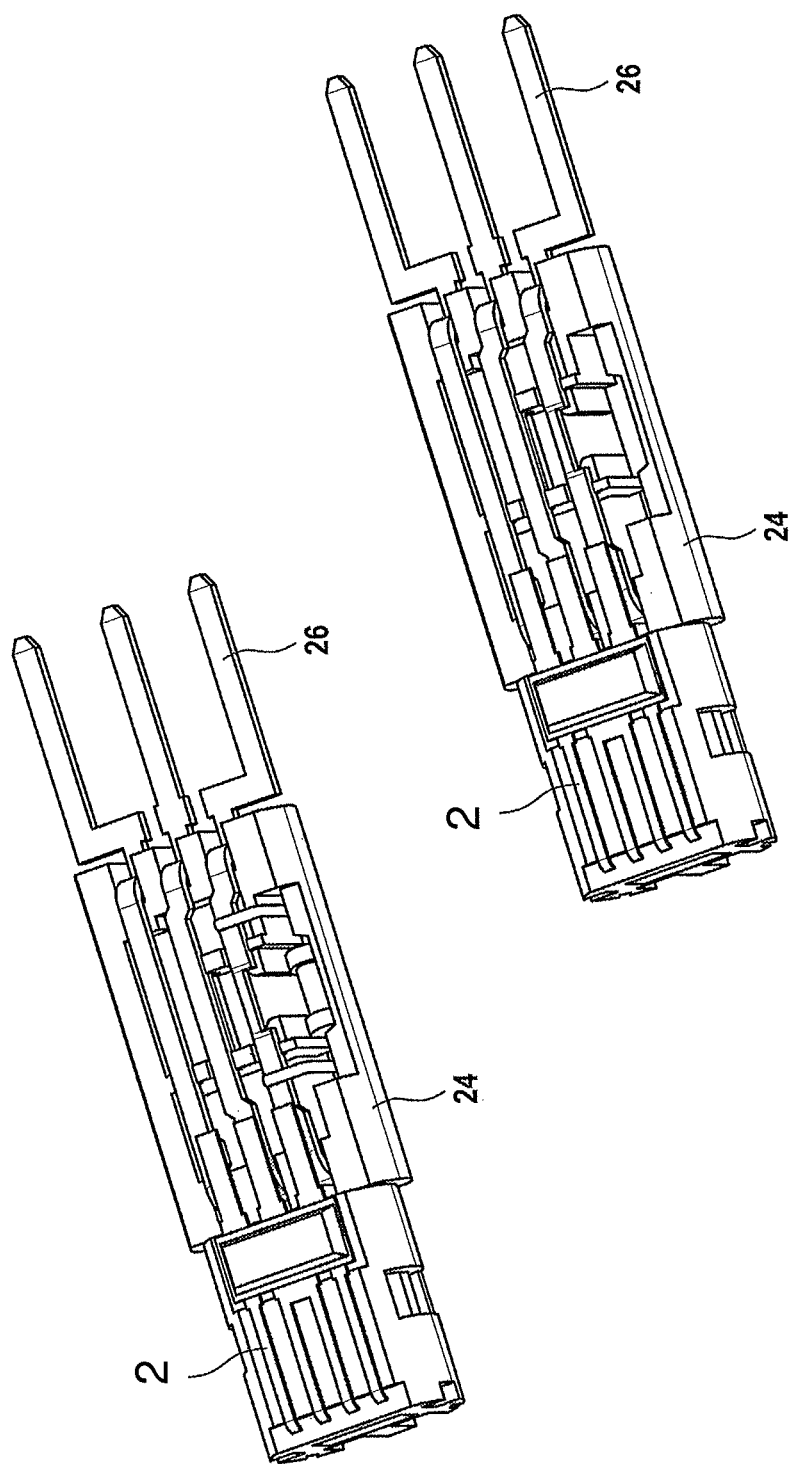

METHOD FOR PRODUCING A SENSOR, AND SENSOR

CROSS REFERENCE TO RELATED APPLICATIONS

This application is the U.S. National Phase Application of PCT/EP2012/075000, filed Dec. 10, 2012, which claims priority to German Patent Application No. 10 2011 121 412.0, filed Dec. 17, 2011, the contents of such applications being incorporated by reference herein.

Field of the Invention

The present invention relates to a method for producing a sensor. It is additionally concerned with a sensor.

BACKGROUND OF THE INVENTION

A plurality of sensors are known which are composed of the actual sensor element for measuring a measuring variable as well as corresponding devices for signal processing, signal evaluation and/or signal transmission. Sensors for measuring the angular position, velocity and speed of crank and cam shafts of vehicles may be named here as an example. A plurality of manufacturing processes is used to produce these types of sensors, different manufacturing measures being produced as a result of the different designs and operating uses of the sensors. Consequently, as a rule, a specific special manufacturing process is used for each sensor.

SUMMARY OF THE INVENTION

An aspect of the invention is a method for producing a sensor, by way of which sensors are able to be produced for different operating uses in an extensively standardized manner.

This aspect is achieved according to the invention by a method which includes the following steps:

pre-injection mold around a sensor element with IC to produce a pre-molded part (sub-module) which is realized such that, as a result of an interference fit, it is able to receive electric contacts for the sensor with different dimensions and/or in different positions;

press the electric contacts into recesses/indentations of the pre-molded part;

connect the connection of the IC of the sensor element to the electric contacts;

insert the pre-molded part into an injection molding mold and injection mold around the pre-molded part to produce the finished sensor.

The method according to an aspect of the invention is based on the basic concept of creating an extensively standardized pre-molded part which is suitable to receive different types of sensor elements and contacts and is consequently able to be developed in dependence on the respective operating use. In this connection, different types of sensor elements with IC can be used. As, over and beyond this, the electric contacts for the sensor are not injected at the same time into the pre-molded part, but are fastened thereon by means of interference fit, it is also possible to select the electric contacts with reference to the respective operating use and to fix them on the pre-molded part. As a result, the pre-molded part as a standard part is able to be equipped with different types of sensor elements and/or electric contacts. Afterwards, the connections of the IC of the sensor element are connected to the electric contacts which, as a result of interference fit, have been arranged in or on the pre-molded part, and the pre-molded part is then injection molded around to produce the finished sensor.

As a result of pre-injection molding around the sensor element with IC to produce the pre-molded part (sub-module), the position of the sensor element and of the IC is established for the further manufacturing process and over the entire service life of the sensor. The pre-molded part, in this case, is designed such that it is able to receive the electric contacts for the sensor over a certain dimension/position range, the contacts being pressed into recesses/indentations of the pre-molded part and consequently being fixed by means of an interference fit. The electric contacts are preferably sheet metal parts which are punched and subsequently bent. They are preferably provided with a slight oversize such that during the entire manufacturing process they are able to be held in position by the resultant pressing, and also later when being injection molded around.

In this connection, the fit between the electric contact and the pre-molded part (sub-module) is suitable for a wide range of material thicknesses, for example between 0.3 mm and 0.8 mm. Wide applicability is possible as a result.

A series of advantages is achieved as a result of pressing the electric contacts directly into the pre-molded part. A greater degree of standardizing as well as uniform usability for many applications is achieved. The pre-molded part can be manufactured independently of the electric contacts. It is independent of the pin occupancy on the plug. The press connection between the pre-molded part and the electric contact is suitable for a wide range of material thicknesses. No additional injection molding around is necessary to fix and position the contacts. Said contacts are held by the pre-molded part. There are fewer electric connections and consequently production expenditure is reduced. Susceptibility to faults is accordingly reduced. The mold concept of the pre-molded part (sub-module) is not made more difficult by running contact strips through it.

In a further development of the method according to the invention, the pre-molded part is injection molded around in the injection molding mold together with a fastening part. In this connection, this can be, for example, a flange which is suitable to receive a screw-type connection.

In the case of the sensors referred to here, magnets are frequently required to generate magnetic fields in order to generate a magnetic measuring variable. For said case, in the case of the method according to the invention, the sensor element with IC is pre-injection molded around together with a magnet in order to obtain a pre-molded part (sub-module) which includes the magnet. In this way, the magnet is able to be incorporated into the pre-molded part without any problems as no contacts, contact strips etc. have been injected into said pre-molded part.

The pre-molded part is preferably realized such that, aside from the electric contacts, it is able to receive further electric/electronic components, such as, for example, an electric resistor. Said components are added once the electric contacts have been pressed into corresponding receiving means of the pre-molded part and, if necessary, are connected directly to the contacts, for example are welded to the contact for the voltage supply. As a result, the components are pre-positioned and are also protected when being injection molded around subsequently.

The pre-molded part is realized in an expedient manner such that the assignment of the electric contacts is able to be changed. Sufficient space is provided in the pre-molded part in order to be able to carry out an assignment change of this type, in particular to cross over the electric contacts (so-called swap). The respective pin assignment of the plug can consequently be adapted to the application. For example, it is possible to swap over the signal line and the earth line.

The pre-molded part is preferably provided with a removable positioning pin in order to enable positioning of the pre-molded part in the injection molding mold. Thus, for example, the positioning of the pre-molded part can be effected by means of the positioning pin on the one side and by means of the contact pins of the plug on the other side. The positioning pin is then able to be removed in a final manufacturing step.

When pre-injection molding around the sensor element with IC to produce the pre-molded part, the sensor element with IC is preferably positioned perpendicularly with respect the axis of the pre-molded part. Once the electric contacts have been pressed into the pre-molded part, the connections of the IC are then bent around (by 90°) prior to connection to the electric contacts.

An aspect of the present invention additionally relates to a sensor including an injection-molded around pre-molded part which is produced as a result of pre-injection molding around a sensor element with IC and as a result of pressing electric contacts for the sensor into the pre-molded part. A sensor of this type comprises an extensively standardized pre-molded part which is suitable to receive different types of sensor elements and electric contacts and can consequently be adapted individually to corresponding operating uses although the manufacturing process is extensively standardized.

BRIEF DESCRIPTION OF THE DRAWINGS

The invention is explained below by way of exemplary embodiments in conjunction with the drawing, in which, in detail:

FIGS. 2a-c shows individual steps for producing a second embodiment of a sensor.

DETAILED DESCRIPTION OF THE INVENTION

Figure 1A:
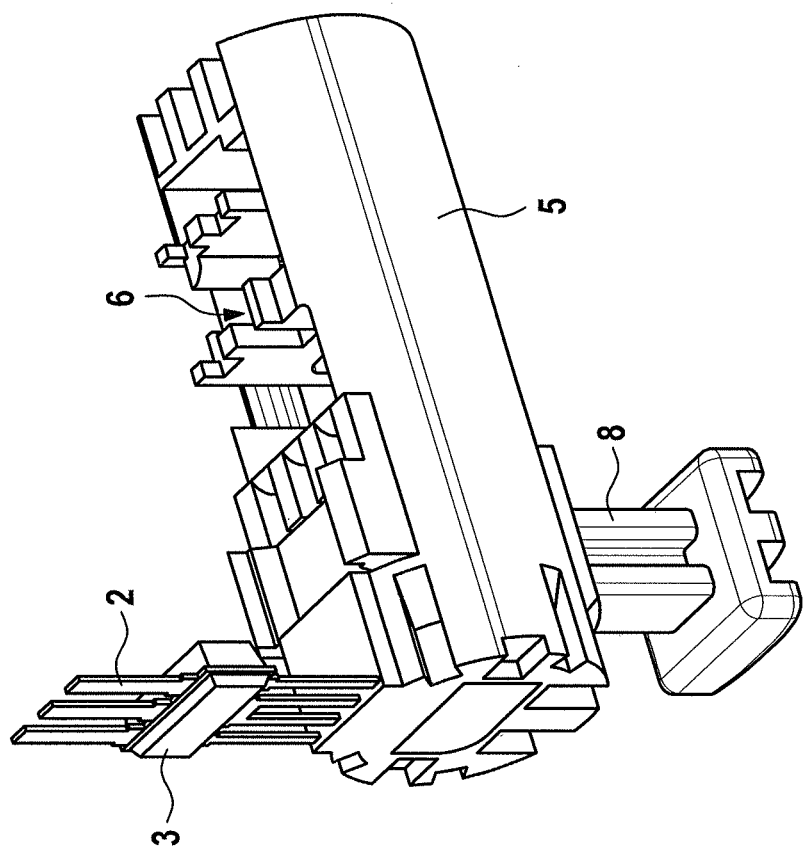
FIGS. 1a-d show individual steps for producing a first embodiment of a sensor.
Figure 1A:
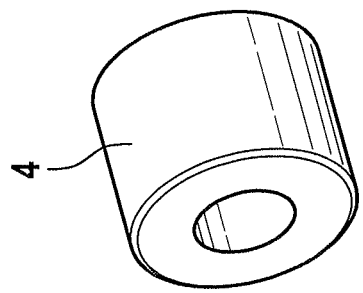
Figure 1A:
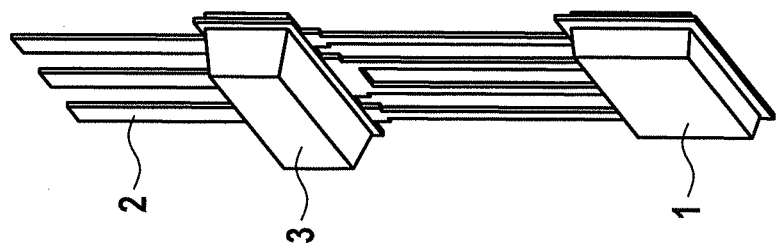

FIG. 1a, on the left-hand side, shows a sensor element 1 with IC as well as corresponding line connections 2, to which a capacitor 3 is assigned. Over and above this, FIG. 1a, in the center, shows a hollow-cylindrical magnet 4. Both parts, i.e. the sensor element 1 and the magnet 4, are pre-injection molded around with a suitable plastics material such that the pre-molded part (sub-module) 5 shown on the right-hand side in FIG. 1a is obtained. The pre-molded part 5, in this case, is realized such that it comprises corresponding recesses/indentations 6 for receiving electrical contacts 7 for the sensor element or the sensor. The sensor element 1, in this case, is injection molded around such that its connections 2 project perpendicularly upward from the pre-molded part 5. The magnet 4 is arranged in the interior of the pre-molded part 5 and cannot be seen.

In addition, the pre-molded part 5 is realized such that it comprises a removable positioning pin 8 which serves for positioning the pre-molded part 5 when it is injection molded around subsequently.

Figure 1B:
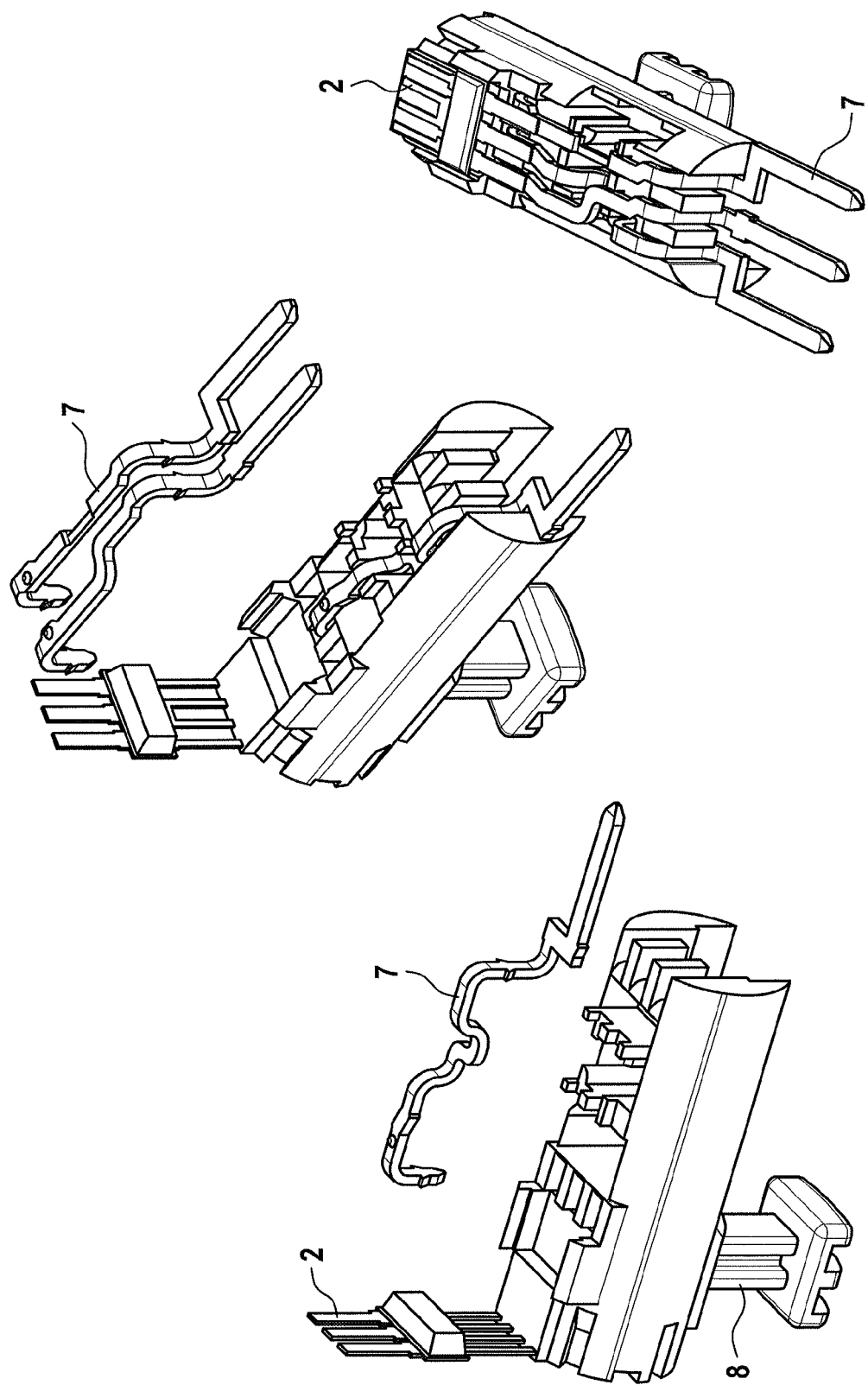
Figure 1C:
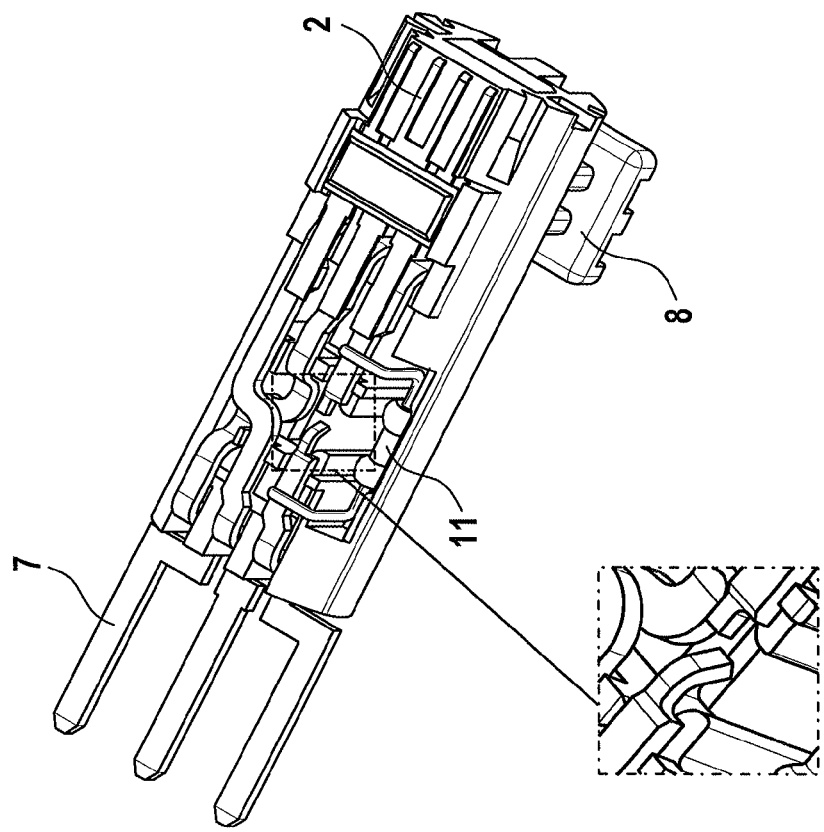
Figure 1C:
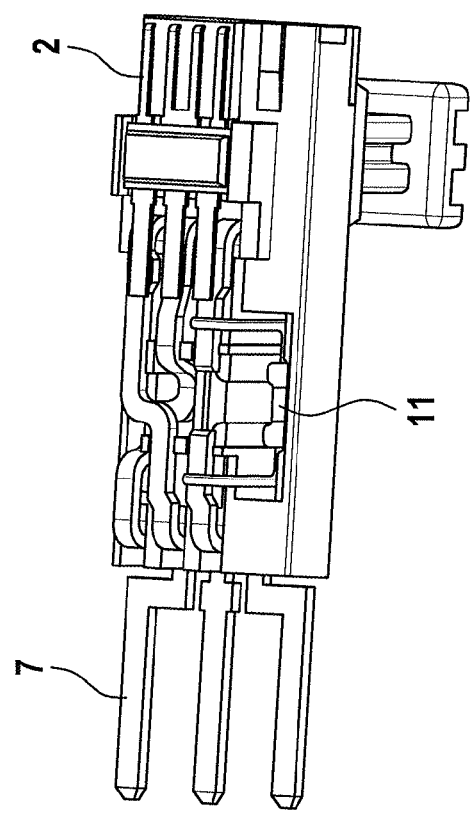

As shown in FIG. 1b, the next step is to press electric contacts 7 for the sensor into the recesses/indentations 6 of the pre-molded part 5. In this case, the recesses/indentations 6 are realized such that, by means of interference fit, they are able to receive differently sized electric contacts 7 or that electric contacts 7 are able to be arranged in different positions. Thus, the electric contacts 7 can be arranged, for example, in a straight line or crossed over, as is shown in FIGS. 1b and 1c.

The electric contacts 7 are sheet metal parts which have been punched and subsequently bent. They are provided with a barb with a slight oversize such that it is possible to produce the corresponding interference fit in this manner. The important point is that said electric contacts 7 and not injected in, but are pressed in such that different types of contacts are able to be arranged in different positions on the pre-molded part 5.

Once the three electrical contacts 7 that are shown here have been pressed in, the connections 2 of the sensor element 1 are bent around and connected (welded) to the ends of the electric contacts 7. The corresponding weld connection is shown by the reference 8 in FIG. 1c.

In the case of the embodiment shown here, an electric resistor 11 is additionally inserted into a receiving means on the pre-molded part 5 and is welded directly with the electric contact for the voltage supply. An interruption between the two weld points is not produced until after the welding. As a result, the design allows for an embodiment both with and without resistor.

Figure 1D:
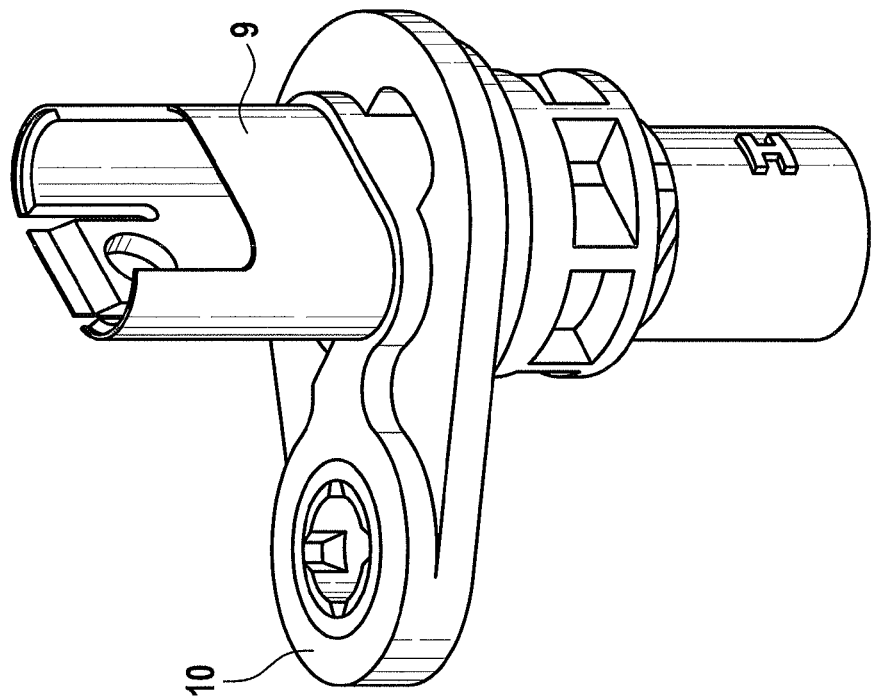
Figure 1D:
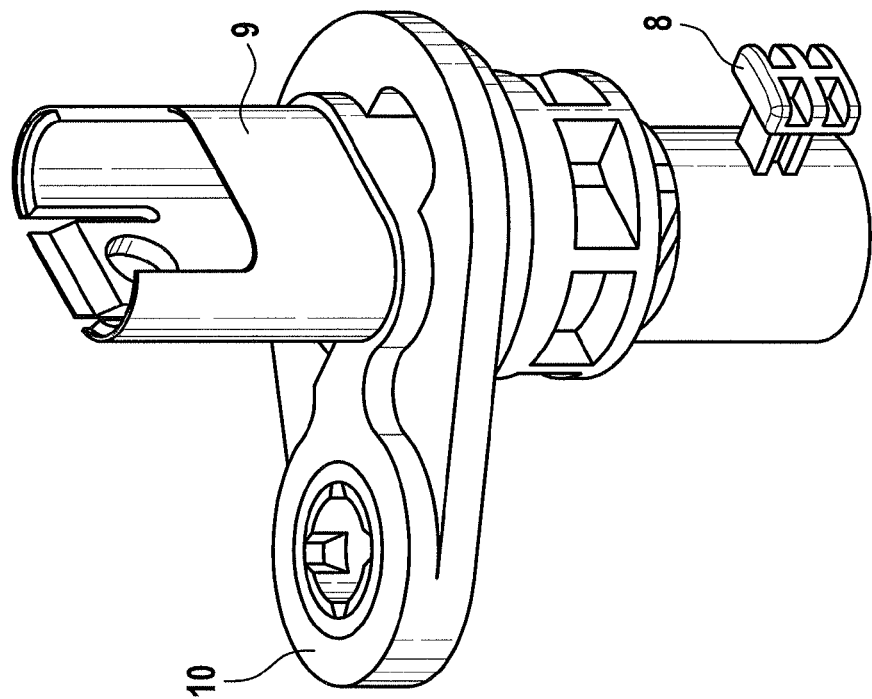

The pre-molded part (sub-module) 5 which is produced in this manner is then placed into an injection molding mold (not shown). Positioning is effected in this connection by means of the positioning pin 8 on the one side and the contact pins of the plug on the other side. Together with a fastening part 10, the pre-molded part 5 is injection molded around with thermoplastic material such that the finished sensor which is shown in FIG. 1d is obtained. As the final manufacturing step, the positioning pin 8 is removed, as is shown in the right-hand image of FIG. 1d.

Figure 2A:
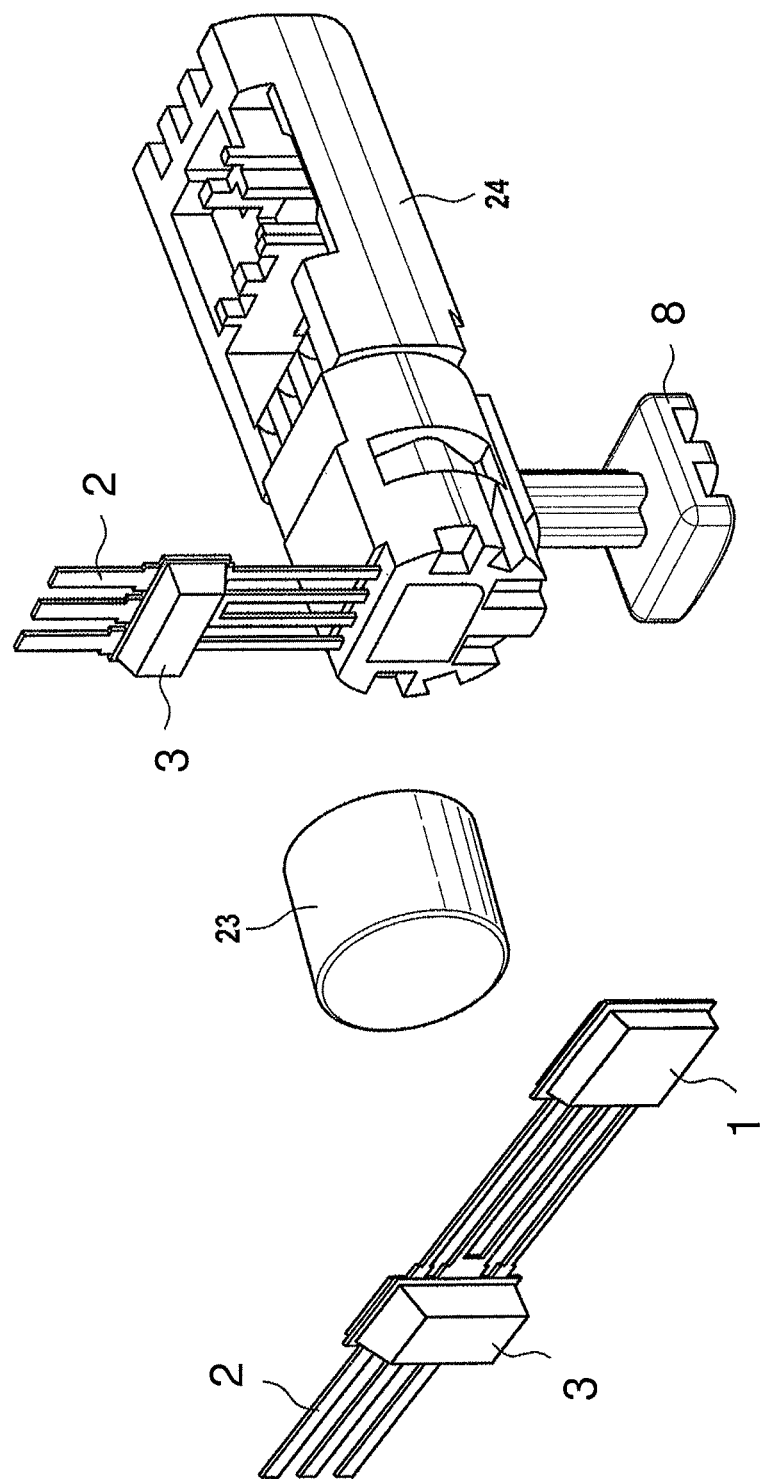
Figure 2B:
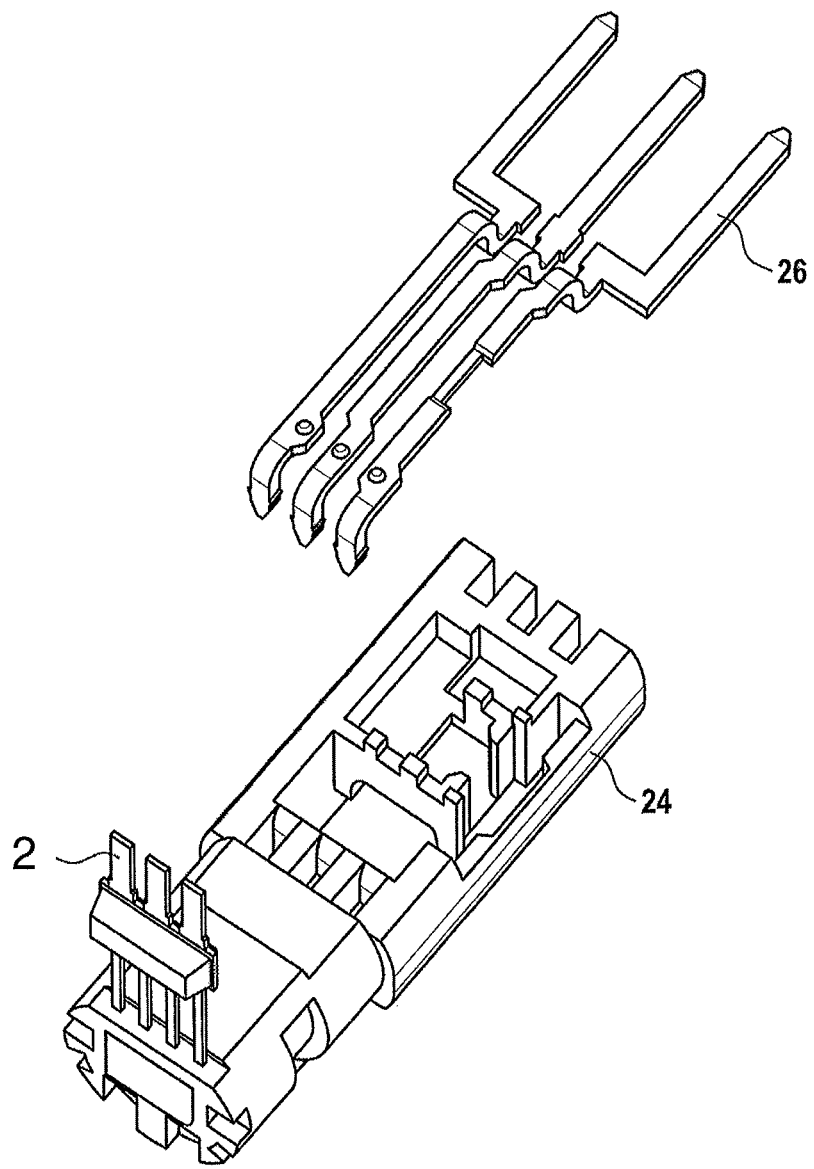

The embodiment of FIGS. 2a-2c only differ from that in Figs. 1a-1d essentially in that a differently realized magnet 23 is injection molded around and that the electric contacts 26 do not cross over. In this connection too, a sensor element 1 with IC and corresponding connections 2 as well as a capacitor 3 are injection molded around together with a magnet 23 for a pre-molded part 24 which comprises a corresponding positioning pin 8. In a further step, electric contacts 26 are pressed into corresponding recesses/indentations of the pre-molded part 24, after which the connections 2 are bent around and welded with the electric contacts 26. Finally, the pre-molded part which is realized in this manner is placed into an injection molding mold and is injection-molded around for the production of the finished sensor.

The invention claimed is:

1. A method for producing a finished sensor, the method comprising:
    producing a pre-molded part by providing a pre-injection mold around a sensor element having an IC and connections, the pre-molded part having the IC of the sensor element embedded within the pre-molded part and being realized such that, as a result of an interference fit, the pre-molded part is able to receive electric contacts for the sensor with different dimensions and/or in different positions;
    pressing the electric contacts into recesses/indentations of the pre-molded part after the pre-molded part is produced;
    connecting the connections of the IC of the sensor element to the electric contacts after the pre-molded part is produced; and producing the finished sensor by inserting the pre-molded part with the electric contacts into an injection molding mold and injection molding around the pre-molded part.

2. The method as claimed in claim 1, wherein the pre-molded part is injection molded around in the injection molding mold together with a fastening part.

3. The method as claimed in claim 1, wherein the sensor element with the IC is pre-injection molded around together with a magnet in order to obtain the pre-molded part which includes the magnet.

4. The method as claimed in claim 1, wherein the pre-molded part is realized such that, aside from the electric contacts, it is able to receive further electric/electronic components, such as an electric resistor.

5. The method as claimed in claim 1, wherein the pre-molded part is realized such that the assignment of the electric contacts is able to be changed.

6. The method as claimed in claim 1, wherein the pre-molded part is provided with a removable positioning pin.

7. The method as claimed in claim 1, wherein the connecting comprises bending the connections of the IC from a first position to a second different position in which the connections can be connected to the electric contacts.

8. The method as claimed in claim 1, wherein the pre-molded part is realized such that sufficient space is provided so that the electrical contacts can be swapped.

9. A finished sensor including a pre-molded part which has been injection molded around and is produced as a result of pre-injection molding around a sensor element comprising an IC such that the IC is embedded within the pre-molded part and as a result of pressing electrical contacts for the sensor into the pre-molded part after the pre-molded part is produced.

* * * * *